US005993939A

United States Patent [19]

Fukuno et al.

[11] Patent Number: 5,993,939

[45] Date of Patent: Nov. 30, 1999

[54] METHOD FOR PREPARING PERMANENT MAGNET MATERIAL, CHILL ROLL, PERMANENT MAGNET MATERIAL, AND PERMANENT MAGNET MATERIAL POWDER

[75] Inventors: Akira Fukuno, Chiba; Hideki Nakamura, Narita; Tetsuhito Yoneyama, Narashino, all of Japan

[73] Assignee: TDK Corporation, Tokyo, Japan

[21] Appl. No.: 08/835,814

[22] Filed: Apr. 16, 1997

Related U.S. Application Data

[62] Division of application No. 07/878,523, May 5, 1992, Pat. No. 5,665,177.

[30] Foreign Application Priority Data

Mar. 24, 1992 [JP] Japan .................................... 4-097023

[51] Int. Cl.[6] ................................ B32B 3/28; H01F 1/04

[52] U.S. Cl. .......................... 428/167; 428/409; 428/900; 148/302; 148/306; 148/311; 148/313

[58] Field of Search .................................... 428/167, 156, 428/900, 141, 409, 213, 332; 148/101, 302, 306, 311, 313; 420/435, 445

[56] References Cited

U.S. PATENT DOCUMENTS

| | | | |
|---|---|---|---|
| 4,705,095 | 11/1987 | Gaspar | 164/463 |
| 4,802,931 | 2/1989 | Croat | 148/302 |
| 5,108,812 | 4/1992 | Takahashi et al. | 428/141 |
| 5,209,789 | 5/1993 | Yoneyama et al. | 148/302 |
| 5,309,977 | 5/1994 | Yoneyama et al. | 164/463 |
| 5,641,363 | 6/1997 | Fukuno et al. | 148/104 |
| 5,665,177 | 9/1997 | Fukuno et al. | 148/101 |

FOREIGN PATENT DOCUMENTS

| | | |
|---|---|---|
| 60-9852 | 1/1985 | Japan . |
| 4-28457 | 1/1992 | Japan . |

*Primary Examiner*—Donald Loney
*Attorney, Agent, or Firm*—Oblon, Spivak, McClelland, Maier & Neustadt, P.C.

[57] ABSTRACT

A permanent magnet material is prepared by cooling with a chill roll a molten alloy containing R wherein R is at least one rare earth element inclusive of Y, Fe or Fe and Co, and B. The chill roll has a plurality of circumferentially extending grooves in a circumferential surface, the distance between two adjacent ones of the grooves at least in a region with which the molten alloy comes in contact being 100 to 300 μm on average in an arbitrary cross section containing a roll axis. Permanent magnet material of stable performance is obtained since the variation of cooling rate caused by a change in the circumferential speed of the chill roll is small. The variation of cooling rate is small even when it is desired to change the thickness of the magnet by altering the circumferential speed. The equalized groove pitch results in a minimized variation in crystal grain diameter.

5 Claims, 4 Drawing Sheets

METHOD FOR PREPARING PERMANENT MAGNET MATERIAL, CHILL ROLL, PERMANENT MAGNET MATERIAL, AND PERMANENT MAGNET MATERIAL POWDER

This is a Division of application Ser. No. 07/878,523 filed May 5, 1992 now U.S. Pat. No. 5,665,177.

BACKGROUND OF THE INVENTION

1. Field of the Invention

This invention relates to a chill roll for use in preparing a permanent magnet material of a R—Fe—B system containing R (wherein R represents a rare earth element inclusive of Y, hereinafter), Fe or Fe and Co, and B by a rapid quenching process, a method for preparing a permanent magnet material using the same chill roll, a permanent magnet material, and a permanent magnet material powder 2. Prior Art As high performance rare earth magnets, powder metallurgical Sm—Co series magnets having an energy product of 32 MGOe have been commercially produced in a mass scale. These magnets, however, undesirably use expensive raw materials, Sm and Co. Among the rare earth elements, those elements having a relatively low atomic weight, for example, cerium, praseodymium and neodymium are available in plenty and less expensive compared to samarium. Further Fe is less expensive than Co. Thus R—Fe—B series magnets such as Nd—Fe—B magnets were recently developed as seen from Japanese Patent Application Kokai No. 9852/1985 disclosing rapidly quenched ones.

The rapid quenching process is to inject a metal melt against a surface of a quenching medium for quenching the melt, thereby obtaining the metal in a thin ribbon, thin fragment or powder form. The process is classified into a single roll, twin roll, and disk process depending on the type of quenching medium. Among these rapid quenching processes, the single roll process uses a single chill roll as the quenching medium. An alloy melt is injected through a nozzle against the circumference of the chill roll rotating relative to the nozzle for contacting the melt with the chill roll circumference, thereby quenching the melt from one direction for obtaining a quenched alloy typically in ribbon form. The cooling rate of the alloy is generally controlled by the circumferential speed of the chill roll. The single roll process is widely used because of a reduced number of mechanically controlled components, stable operation, economy, and ease of maintenance. The twin roll process uses a pair of chill rolls between which an alloy melt is interposed for quenching the melt from two opposite directions.

DISCLOSURE OF THE INVENTION

The single roll process has the general propensity that if the cooling rate on one surface of alloy melt in contact with the chill roll surface (to be referred to as roll surface, hereinafter) is set within an optimum range, then the cooling rate on an opposite surface (to be referred to as free surface, hereinafter) is insufficient. Then a desirable grain diameter is available near the roll surface, but coarse grains are formed near the free surface, failing to provide a high coercive force.

On the other hand, if cooling is made such that a desirable grain diameter is available near the free surface, then the cooling rate near the roll surface is extremely increased so that an almost amorphous state appears near the roll surface, also failing to achieve high magnetic properties.

For this reason, the prior art practice is to select the circumferential speed of a chill roll such that the quenched alloy as a whole contains a maximum number of crystal grains having a desirable grain diameter. The selected speed is known as an optimum circumferential speed.

However, the thus determined optimum circumferential speed is in a very narrow range, for example, 25 m/s with a deviation of ±0.5 to 2 m/s although the exact speed varies with the alloy composition and the chill roll material. Strict control of circumferential speed is thus necessary and this is detrimental to cost efficient mass scale production.

Besides, since the range of a region having a desirable grain diameter (thickness in a cooling direction) is substantially constant and does not largely depend on the thickness of a ribbon, the magnetic properties of a ribbon as a whole are improved by reducing the thickness thereof. For a predetermined amount of alloy melt injected through a nozzle, the ribbon thickness depends on the circumferential speed of a chill roll. Then increasing the circumferential speed will result in a thinner ribbon. Since the optimum circumferential speed is dictated by a particular alloy composition as previously mentioned, the chill roll itself must be exchanged in order to increase the circumferential speed for reducing the ribbon thickness. This is impractical.

On the other hand, the ribbon thickness can be reduced by reducing the amount of alloy melt injected through a nozzle with the resultant tendency that the nozzle is clogged during continuous operation because the melt of R—Fe—B alloy is reactive with the material of which the nozzle is made. Therefore, the nozzle diameter cannot be reduced below a certain limit when commercial mass scale production is intended.

Furthermore, even when cooling is made at the optimum circumferential speed, the grain diameter can differ by a factor of about 10 between the roll and free surfaces, a desirable grain diameter is available only in a very narrow region, and the quenched alloy shows non-uniform magnetic properties in the cooling direction.

As a consequence, when the quenched alloy is crushed, the resulting magnet powder is a mixture of magnet particles having high magnetic properties and magnet particles having low magnetic properties. This magnet powder is dispersed in a resin binder to form a bonded magnet which does not have high magnetic properties as a whole.

On the other hand, the twin roll process results in a ribbon which has an approximately equal grain diameter on the opposed surfaces due to the absence of a free surface. However, a difference in grain diameter is still a problem as in the single roll process because the cooling rate differs between the roll-contact surfaces and an intermediate of the ribbon.

Under these circumstances, the inventors proposed in Japanese Patent Application No. 131492/1990 a chill roll designed for reducing the dependency of magnetic properties on circumferential speed by providing the chill roll with a circumferential surface whose centerline average roughness Ra falls within in a specific range.

For the purpose of reducing the difference in cooling rate between the roll and free surfaces, the inventors also proposed in Japanese Patent Application No. 163355/1990 to provide a chill roll of copper or copper alloy with a surface layer of Cr or the like for controlling heat transfer on the chill roll upon cooling the alloy melt and to select the thickness of the surface layer within an optimum range.

An object of the present invention is to further improve our previous proposals and to provide means for preparing a R—Fe—B series permanent magnet material having a more uniform crystal grain diameter.

This and other objects are attained by the present invention which is defined below as (1) to (19).

(1) A method for preparing a permanent magnet material by cooling a molten alloy containing R wherein R is at least one rare earth element inclusive of Y, Fe or Fe and Co, and B, said method comprising using a chill roll having an axis, a circumferential surface, and a plurality of circumferentially extending grooves in the circumferential surface, the distance between two adjacent ones of the grooves at least in a region with which the molten alloy comes in contact being 100 to 300 um on average in an arbitrary cross section containing the axis, and injecting the molten alloy through a nozzle against the circumferential surface of said chill roll.

(2) A method for preparing a permanent magnet material according to (1) wherein the circumferential surface of said chill roll at least in the region with which the molten alloy comes in contact has a centerline average roughness (Ra) of 0.07 to 5 μm.

(3) A method for preparing a permanent magnet material according to (1) or (2) wherein the-grooves of said chill roll at least in the region with which the molten alloy comes in contact have an average depth of 1 to 50 μm.

(4) A method for preparing a permanent magnet material according to (1) wherein the grooves of said chill roll are formed in a spiral fashion.

(5) A method for preparing a permanent magnet material according to (1) wherein said chill roll includes a base having a circumferential surface and a Cr surface layer formed at least in a region of the base circumferential surface with which the molten alloy comes in contact, said base having a higher thermal conductivity than said Cr surface layer.

(6) A method for preparing a permanent magnet material according to (5) wherein said Cr surface layer is 10 to 100 μm thick.

(7) A method for preparing a permanent magnet material according to (1) wherein the molten alloy is cooled by a single roll process while said chill roll is disposed such that its axis is kept substantially horizontal, the molten alloy being cooled under the following conditions that:

the molten alloy is injected forward of the rotational direction of said chill roll with respect to a plane containing a center of the nozzle and the axis of said chill roll, provided that A is the location at which the molten alloy impinges against the chill roll circumferential surface, B is the nozzle center, and C is the intersection between a vertical line passing B and the chill roll circumferential surface, the angle $\phi$ between a tangent to the circumferential surface at A and line AB is 45° to 78°, line BC has a length of 1 to 7 mm, the ambient pressure is up to 90 Torr during cooling, and the differential pressure of the molten alloy in the nozzle between upper and lower surfaces is 0.1 to 0.5 kgf/cm$^2$.

(8) A chill roll for use in preparing a permanent magnet material by cooling a molten alloy containing R wherein R is at least one rare earth element inclusive of Y, Fe or Fe and Co, and B, wherein said chill roll has an axis, a circumferential surface, and a plurality of circumferentially extending grooves in the circumferential surface, and the distance between two adjacent ones of the grooves at least in a region with which the molten alloy comes in contact is 100 to 300 μm on average in an arbitrary cross section containing the axis.

(9) A chill roll according to (8) wherein the circumferential surface at least in the region with which the molten alloy comes in contact has a centerline average roughness (Ra) of 0.07 to 5 μm.

(10) A chill roll according to (8) or (9) wherein the grooves at least in the region with which the molten alloy comes in contact have an average depth of 1 to 50 μm.

(11) A chill roll according to (8) wherein the grooves are formed in a spiral fashion.

(12) A chill roll according to (8) which includes a base having a circumferential surface and a Cr surface layer formed at least in a region of the base circumferential surface with which the molten alloy comes in contact, said base having a higher thermal conductivity than said Cr surface layer.

(13) A chill roll according to (12) wherein said Cr surface layer is 10 to 100 μm thick.

(14) A permanent magnet material having a plurality of longitudinally extending ridges on at least one major surface, the distance between two adjacent ones of the ridges being 100 to 300 μm on average.

(15) A permanent magnet material according to (14) wherein the major surface having the ridges has a centerline average roughness (Ra) of 0.05 to 4.5 μm.

(16) A permanent magnet material according to (14) wherein the ridges have an average height of 0.7 to 30 μm.

(17) A permanent magnet material according to (14) which has a thickness with a standard deviation of up to 4 μm as measured at an arbitrary position.

(18) The permanent magnet material of (14) which is prepared by using a chill roll according to any one of (8) to (13).

(19) A permanent magnet material powder prepared by pulverizing the permanent magnet material of (14).

OPERATION AND ADVANTAGES OF THE INVENTION

In the single and twin roll processes, the alloy cooling rate increases as the circumferential speed of a chill roll increases. This is because with an accelerated circumferential speed, the surface area of the chill roll available per unit time is increased. If the chill roll has corrugations on its circumference, the molten alloy reaching the chill roll at its circumference is in close contact with protrusions, but in poor contact with recesses on the chill roll circumference, the contact with recesses being further exacerbated with the increasing circumferential speed. As a result, a higher circumferential speed leads to a smaller contact area of the alloy with the chill roll circumference, which leads to a lower cooling rate as compared with a chill roll having a smooth circumference.

Accordingly, the cooling rate of molten alloy is given as a combination of an increase of cooling rate due to an increase in the available chill roll surface area with a decrease of cooling rate depending on the surface roughness of the chill roll circumference, indicating that the cooling rate changes despite of the fixed circumferential speed if the surface roughness of the chill roll circumference varies.

The chill roll of the present invention has a plurality of circumferentially extending grooves at a predetermined pitch so that an increase of cooling rate due to an increase in the available chill roll surface area may match with a decrease of cooling rate depending on the surface roughness of the chill roll circumference, ensuring that the cooling rate of alloy remains substantially unchanged even if the circumferential speed varies and minimizing a local variation of the cooling rate.

As a result, the present invention provides a permanent magnet material whose dependency of magnetic properties on the chill roll circumferential speed is minimized in that the crystal grain diameter remains substantially unchanged irrespective of a variation in the circumferential speed. The equalized groove pitch minimizes a variation of crystal grain diameter in a major surface. Accordingly, permanent magnet material having little varying properties can be mass produced at low cost in a consistent manner without strict control of the circumferential speed of the chill roll while extending the practical life of the apparatus.

Additionally, since a substantially constant cooling rate is available over a wide range of circumferential speed, the thickness of permanent magnet material can be altered to any desired value with a minimal variation of magnetic properties by changing the circumferential speed. Therefore, a permanent magnet material of thin gage can be produced without reducing the diameter of the molten alloy injecting nozzle. That is, a permanent magnet material containing a larger proportion of crystal grains having a desired grain diameter can be effectively produced in a mass scale.

Further, the use of the chill roll according to the present invention ensures good magnetic properties even when a permanent magnet material of fixed thickness is produced at the optimum circumferential speed.

PREFERRED EMBODIMENTS

Now the construction of the present invention is described in detail. According to the present invention, a permanent magnet material is prepared by injecting through a nozzle a molten alloy containing R wherein R is at least one rare earth element inclusive of Y, Fe or Fe and Co, and B, thereby bringing the molten alloy in contact with the circumference of a chill roll rotating relative to the nozzle, for cooling the alloy. That is, the present invention uses a single or twin roll process for quenching molten alloy.

Grooves in chill roll circumferential surface

Figure 1:
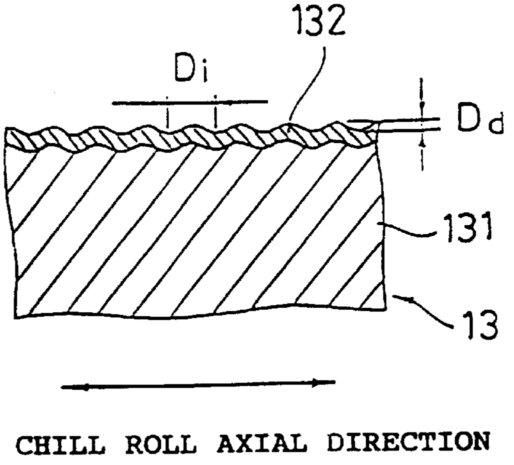
FIG. 1 is a fragmental cross section of a chill roll.

As shown in FIG. 1, a chill roll 13 according to the present invention has a plurality of grooves or corrugations in a circumferential surface thereof. The grooves extend circumferentially in the circumferential surface. The distance Di between two adjacent ones of the grooves at least in a region with which the molten alloy comes in contact is 100 to 300 μm on average in an arbitrary cross section containing an axis of the chill roll (as shown in FIG. 1, the distance between two adjacent grooves is measured with respect to corresponding portions of the adjacent grooves). If the average of distance Di is less than the range, the molten alloy enters the grooves with difficulty so that the molten alloy might not be uniformly cooled, and the roll becomes less effective for controlling a variation of cooling rate. If distance Di is beyond the range, the degree of contact of molten alloy in the grooves is not reduced at a higher circumferential speed, also resulting in less effective cooling rate control. It will be understood that preferably, distance Di for all the grooves is within the above-defined range, and more preferably, distance Di is identical for all the grooves.

The circumferentially extending grooves used herein include not only those grooves whose direction coincides with a circumferential direction, but also those grooves whose direction intersects with a circumferential direction. For example, when a chill roll is machined by moving a cutting tool along the circumferential surface of the roll in a transverse direction while rotating the roll, there are formed spiral grooves whose direction does not coincide with a circumferential direction. The angle between the grooves' direction and the circumferential direction should preferably be up to 30°. When spiral grooves are machined by the above-mentioned method, the angle is often within 3°.

Although the above-mentioned machining method forms a single continuous groove in the circumferential surface at a predetermined pitch, formation of a plurality of grooves is acceptable in the present invention. The grooves may be discontinuous grooves rather than continuous grooves making a full turn around the circumference. Serpentine grooves are also acceptable.

Preferably, the grooves in a region with which molten alloy comes in contact have a depth Dd of 1 to 50 μm on average. If average depth Dd is outside the range, especially if the depth is beyond the range, cooling rate control would become less effective. It will be understood that preferably, depth Dd for all the grooves is within the above-defined range, and more preferably, depth Dd is substantially identical for all the grooves.

The cross-sectional shape of the grooves in a cross section containing the chill roll axis is not particularly limited although a sine curved cross section, that is, a cross section in which protrusions and recesses are smoothly contiguous rather than being rectangular, is more effective for controlling the contact of molten alloy therewith. It will be understood that the cross-sectional shape of the grooves is determinable using a probe type surface roughness meter or the like.

The method of forming grooves in the chill roll is not particularly limited and a choice may be made among various machining and chemical etching methods. Preferred machining is grooving in the above-mentioned mode because of high precision of the groove pitch.

Surface roughness of chill roll circumference

The circumferential surface of the chill roll in the region which comes in contact with the molten alloy has a centerline average roughness (Ra) of 0.07 to 5 μm, preferably 0.15 to 4 μm. If Ra of the chill roll circumference is below the range, the close contact of molten alloy with the chill roll circumference would not be diminished by increasing the circumferential speed so that the dependency of cooling rate on circumferential speed is increased. If the chill roll's Ra is beyond the range, the surface roughness of the chill roll circumference would be unnegligibly high compared with the thickness of permanent magnet material being cooled, resulting in a permanent magnet material of varying thickness. It is to be noted that the centerline average roughness (Ra) is prescribed by JIS B-0601.

Chill roll surface layer

For minimizing a variation of the crystal grain diameter of permanent magnet material, the chill roll is preferably comprised of a base and a Cr surface layer on the base surface. The base is selected such that the thermal conductivity of the Cr surface layer is lower than that of the base. In general, the Cr surface layer has a thermal conductivity of up to 0.6 J/(cm·s·K), especially up to 0.45 J/(cm·s·K). It is to be noted that the thermal conductivity used herein is at room temperature and atmospheric pressure.

The Cr surface layer preferably has a Vickers hardness Hv of at least 500, more preferably at least 600. With Hv of less than 500, the Cr surface layer would be worn too much during molten alloy cooling, resulting in varying Ra and hence, a variation in magnetic properties between different lots. Also, the Cr surface layer preferably has a Vickers hardness Hv of up to 1200, more preferably up to 1050. With Hv of more than 1200, the Cr surface layer would undergo cracking or stripping due to thermal impact after repeated molten alloy cooling, making it substantially impossible to cool molten alloy.

Preferably, the Cr surface layer has a thickness of 10 to 100 $\mu$m, especially 20 to 50 $\mu$m. When the Cr surface layer has a thickness within the range, heat transfer to the base takes place fast enough to allow a grain boundary phase consisting essentially of a R-poor phase to precipitate, achieving a high residual magnetic flux density. Such a benefit would be lost if the Cr surface layer has a thickness outside the range. An actual thickness may be determined within the above-defined range by taking into account various conditions including the dimensions and the speed of the chill roll relative to molten alloy.

The formation of a Cr surface layer is not particularly limited and a choice may be made among liquid phase plating, gas phase plating, thermal spraying, bonding of a thin plate, shrink fitting of a cylindrical sleeve, and so forth. It is preferred to form a Cr surface layer by electrodeposition because of ease of control of Vickers hardness. In the electrodeposition method, the Vickers hardness of a Cr surface layer may be controlled by selecting plating conditions such as current density, the concentration of Cr source in the plating bath, and bath temperature. Understandably, after a Cr surface layer is formed, its surface may be polished if desired.

The permanent magnet material obtained using a chill roll having such a surface layer often contains Cr in the vicinity of its roll surface. This Cr is what has diffused from the chill roll circumference during rapid quenching. The Cr content is about 10 to 500 ppm in a region extending up to 20 nm from the roll surface in a thickness direction.

The chill roll base may be formed of any desired material insofar as it meets the thermal conductivity requirement mentioned above. For example, copper, copper alloys, silver, silver alloys and the like may be used, and aluminum and aluminum alloys are also useful for rapid quenching of low-melting alloys. Copper and copper alloys are preferred for high thermal conductivity and low cost. Copper-beryllium alloy is a preferred copper alloy. Preferably, the roll base has a thermal conductivity of at least 1.4 J/(cm·s·K), more preferably at least 2 J/(cm·s·K), most preferably at least 2.5 J/(cm·s·K).

In order to provide a Cr surface layer of uniform thickness, it is preferred to provide a base on its circumference with grooves and then deposit a Cr surface layer on the base by liquid phase plating, gas phase plating, thermal spraying or the like. In the embodiment wherein a Cr surface layer is formed by joining a thin plate or by shrink fitting a cylindrical member, a grooved thin plate or cylindrical member is used or grooves are formed after joining or shrink fitting.

Permanent magnet material

By cooling the molten alloy with the above-mentioned chill roll, there is obtained a permanent magnet material having longitudinally extending ridges on at least one of major surfaces. The distance between two adjacent ones of the ridges is generally 100 to 300 $\mu$m on average. The ridges generally have an average height of about 0.7 to 30 $\mu$m where the grooves have an average depth within the previously defined range. Further, the permanent magnet material on the roll surface generally has a Ra which is equal to or less than the Ra of the chill roll circumference. This is because the degree of contact of the alloy with the chill roll diminishes as the chill roll circumferential surface increases. Where the chill roll circumference has a Ra within the previously defined range, the permanent magnet material on the roll surface has a Ra which corresponds to the chill roll circumference's Ra, namely, of 0.05 to 4.5 $\mu$m preferably 0.13 to 3.7 $\mu$m.

The quenched permanent magnet material may be pulverized to a particle size of about 30 to 700 $\mu$m before a bonded magnet is prepared therefrom. Even in powder form, particles are found to have ridges by observing the roll surface of the particles.

Rapid quenching with the above-mentioned chill roll results in a permanent magnet material which has a surface having been in contact with the chill roll during rapid quenching (roll surface), a region D disposed remotest from the roll surface in a thickness direction, and a region P disposed adjacent the roll surface, wherein region D has an average grain diameter d and region P has an average grain diameter p wherein $d/p \leqq 10$, preferably $d/p \leqq 4$, more preferably $d/p \leqq 2.5$. It is to be noted that the lower limit of d/p is generally 1. The use of the above-mentioned chill roll, especially the chill roll having a Cr surface layer facilitates to achieve a better d/p value within $1.5 \leqq d/p \leqq 2$.

The average grain diameter of each of these regions is calculated as follows. The permanent magnet material is generally available in the form of a thin ribbon, flakes or flat particles. The permanent magnet material in such form has a roll surface and a surface opposed thereto (free surface) as major surfaces in the case of the single roll process, but two opposed roll surfaces as major surfaces in the case of the twin roll process. The thickness direction of permanent magnet material used herein refers to a direction normal to the major surface. The above-mentioned region D is a region disposed adjacent the free surface in the case of the single roll process, and intermediate in the thickness direction (cooling direction) in the case of the twin roll process. The region P is a region disposed adjacent the roll surface. Each of regions D and P has a width in the magnet thickness direction which is equal to ⅕ of the magnet thickness.

Preferably, average grain diameter d in region D ranges from 0.01 to 2 $\mu$m, especially from 0.02 to 1.0 $\mu$m and average grain diameter p in region P ranges from 0.005 to 1 $\mu$m, especially from 0.01 to 0.75 $\mu$m. Energy product would be low with an average grain diameter below these ranges whereas coercive force would be low with an average grain diameter above these ranges. Measurement of average grain diameter in these regions is preferably carried out using a scanning electron microscope.

Further preferably, the grain boundary has a width of from 0.001 to 0.1 $\mu$m, especially from 0.002 to 0.05 $\mu$m in region D and from 0.001 to 0.05 $\mu$m, especially from 0.002 to 0.025 $\mu$m in region P. Coercive force would be low with a grain boundary width below these ranges whereas saturation magnetic flux density would be low with a grain boundary width beyond these ranges.

It is to be noted that the permanent magnet material should preferably have a thickness of at least 10 $\mu$m. Thickness of less than 10 $\mu$m has the tendency that permanent magnet material has an unnecessarily increased surface area and is thus prone to oxidation during pulverizing prior to the manufacture of bonded magnets and handling.

In the case of single roll process, the permanent magnet material preferably has a thickness of up to 60 $\mu$m. With such a thickness, the difference in average grain diameter between the roll and free surface sides is minimized. The use of the above-defined chill roll which ensures a substantially constant cooling rate over a wide range of circumferential speed permits a thin ribbon-shaped permanent magnet material to be produced to a thickness of 45 $\mu$m or less without reducing the diameter of the alloy melt injection nozzle.

Also preferably, the permanent magnet material has a thickness with a standard deviation of up to 4 $\mu$m as measured at an arbitrary position. A minimized variation of thickness leads to a minimized variation of crystal grain diameter which ensures that the magnet material is pulverized into a magnet powder consisting of magnet particles having approximately identical properties. Permanent magnet material of uniform thickness can be effectively pulverized into a magnet powder having a narrow particle size distribution. As a result, there can be produced a bonded magnet having a high coercive force and high residual magnetic flux density. Although what causes a variation of thickness includes entrainment of the atmospheric gas, shortage of the pressure under which molten alloy is injected through the nozzle, and other factors causing a lowering of the degree of contact of molten alloy with the chill roll circumference, the use of the grooved chill roll increases the area of contact of molten alloy with the chill roll circumference and hence the degree of contact, facilitating the production of a permanent magnet material having a thickness with a standard deviation of up to 4 μm.

The composition of the molten alloy which is cooled with the chill roll according to the present invention is not particularly limited as long as it contains R (wherein R is at least one rare earth element inclusive of Y), Fe or Fe and Co, and B. Benefits of the present invention are obtained with any alloy composition. Cooling results in a permanent magnet material which preferably has only a primary phase of substantially tetragonal grain structure or such a primary phase and an amorphous and/or crystalline auxiliary phase. A stable tetragonal compound of R—T—B system wherein T is Fe and/or Co is $R_2T_{14}B$ wherein R=11.76 at %, T=82.36 at % and B=5.88 at %, and the primary phase consists essentially of this compound. The auxiliary phase is present as a grain boundary layer around the primary phase.

Preparation method

Figure 3:
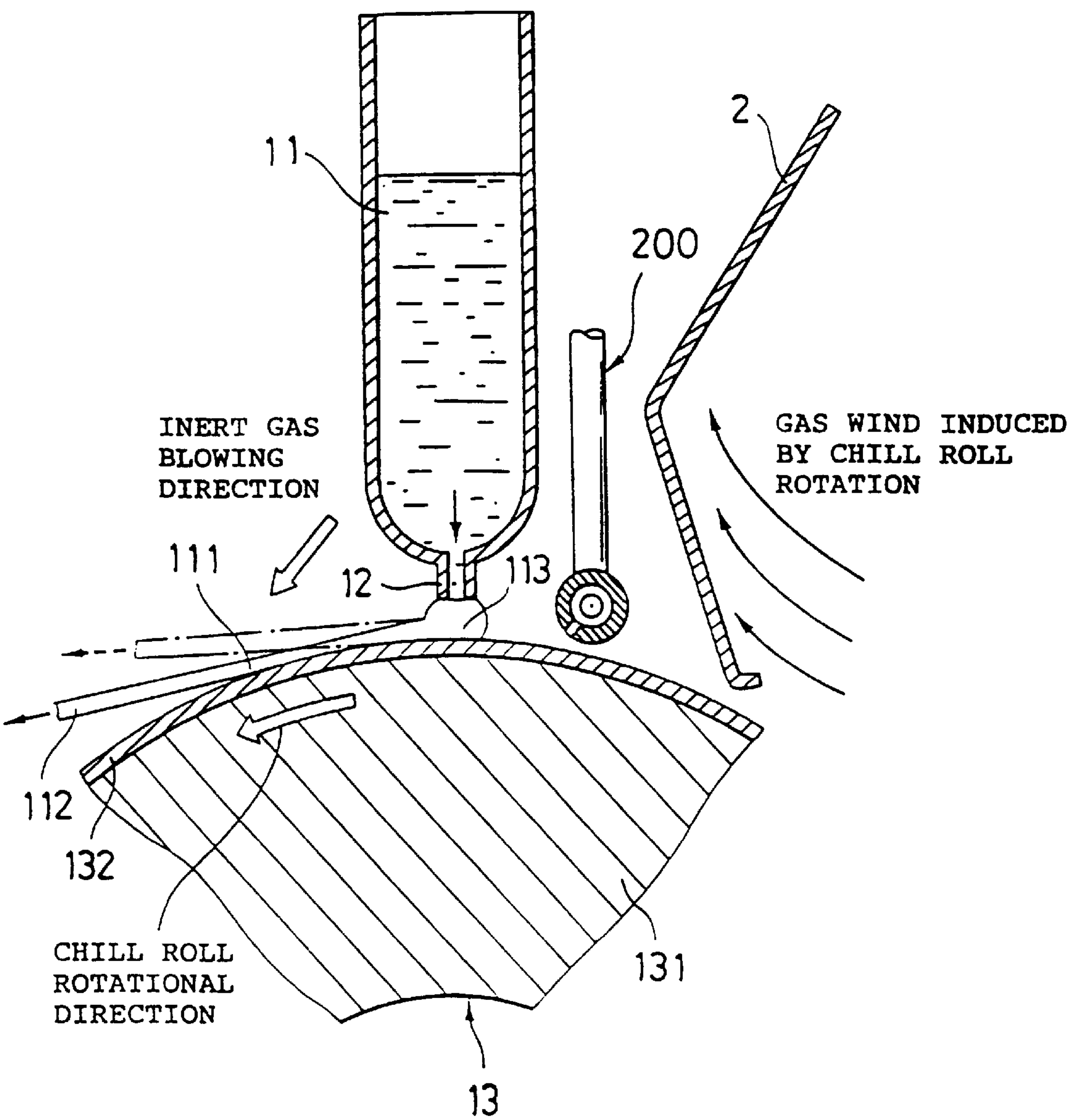
FIG. 3 is a cross-sectional view showing one preferred arrangement of permanent magnet material producing apparatus.

FIG. 3 shows a preferred arrangement wherein the chill roll of the present invention is applied to a single roll process in an atmosphere having a relatively high pressure which is approximate to atmospheric pressure.

Wind shield

A chill roll 13 and a nozzle 12 are in an inert gas atmosphere and the chill roll 13 is rotating in the arrow direction. Due to its viscosity, inert gas in proximity to the chill roll 13 forms a gas wind having a velocity in the rotational direction of the chill roll. An alloy melt 11 is injected through nozzle 12 against chill roll 13 for contacting the chill roll circumference where it is cooled into a ribbon-shaped permanent magnet material 112 and flew away in the rotational direction of chill roll 13. A wind shield 2 is provided in proximity to the chill roll circumference on the right side of nozzle 12 as viewed in the figure (or the front side with respect to the rotational direction). The wind shield 2 is effective in shielding at least part of the inert gas wind flowing over the chill roll circumference for preventing the inert gas wind reaching a paddle 113 (a mass of alloy melt exiting from the tip of nozzle 12 to the circumference of chill roll 13), thereby minimizing the amount of inert gas entrained between the chill roll circumference and the melt being injected.

Where no vacuum is provided during cooling of the alloy melt, it is preferred to dispose wind shield 2 upstream of nozzle 12 for preventing the inert gas wind from reaching paddle 113 of alloy melt 11. This arrangement is effective for minimizing the amount of inert gas entrained between the chill roll circumference and the melt being injected, thus improving the degree of contact of the alloy with the chill roll circumference, thus reducing a local variation of the cooling rate on the roll surface and reducing a variation of crystal grain diameter on the free surface, thus allowing a fine uniform crystal grain structure to form, eventually resulting in a permanent magnet material having high magnetic properties.

No particular limit is imposed on the configuration of the wind shield 2 which can shield at least part of the inert gas wind flowing toward the paddle 113. It is preferred to form the wind shield 2 from a plate member which is configured as shown in FIG. 3 because of ease of fabrication and high gas flow shielding effect. The wind shield 2 shown in FIG. 3 includes three plate segments connected at two bends. If the plate-like wind shield 2 is elastic, the plate segment located nearest to the chill roll tends to float upward from the chill roll circumference upon receipt of the gas wind induced by rotation of the chill roll. The floating amount, that is, the distance between the wind shield and the chill roll circumference can be controlled by adjusting the angle relative to the chill roll circumference and the area of the lowest plate segment. However, a rigid wind shield is also acceptable which can keep a fixed distance between the wind shield and the chill roll independent of rotation of the-chill roll.

In addition to the wind shield of the construction shown in FIG. 3, a wind shield of the following construction is also useful. For example, a wind shield of the construction shown in FIG. 3 is provided at each transverse end with a side plate which covers at least a part of the side surface of the chill roll, preferably the side surface of the chill roll in proximity to the paddle 113, thereby shielding at least part of the gas flow approaching the paddle from the opposite sides thereof. Also a wind shield which is longitudinally or transversely bent, for example, a wind shield of U-shaped cross section surrounding the paddle may be used for rectifying the gas flow and preventing entrainment of the gas flow in proximity to the paddle.

The spacing between the wind shield 2 and the chill roll circumference is not particularly limited, but may be suitably determined in accordance with the location of wind shield 2 and the circumferential speed of chill roll 13. Since the gas flow induced by rotation of the chill roll has a velocity distribution that velocity is maximum at the chill roll circumference and drastically lowers in proportion to the distance from the circumference, the spacing is preferably 5 mm or less, especially 3 mm or less during rotation of the chill roll for effectively shielding the gas flow. No lower limit is imposed on the spacing although the spacing should preferably be 0.1 mm or more, especially 0.2 mm or more in order to avoid potential contact of the wind shield with the chill roll circumference during chill roll rotation probably due to circumferential asperities and eccentricity of the chill roll. The spacing should preferably be constant along the breadth direction of the wind shield although the spacing can be locally varied within the above-mentioned range.

Also, no particular limit is imposed on the breadth of the wind shield (the distance between opposite ends of the wind shield in a transverse direction over the circumference of the chill roll) although the wind shield breadth should preferably be larger than the breadth of the chill roll, especially by about 10%.

No particular limit is imposed on the height of the wind shield. That is, the wind shield can have an adequate height as desired since the pattern of gas flow to be shielded varies with the circumferential speed of the chill roll or the like. Since the nozzle having the molten alloy received therein is also exposed to the gas wind, the wind shield should preferably have a sufficient height for shielding the gas flow from reaching the nozzle, particularly when the nozzle is susceptible to cooling therewith. Protection of the nozzle against cooling can keep the melt at a constant temperature and therefore, provide a constant flow rate of the melt discharged from the nozzle, ensuring the manufacture of a permanent magnet material which is homogeneous in a longitudinal direction and has least property difference between lots.

The location of the wind shield relative to the nozzle is not particularly limited and the wind shield may be located at a suitable position, depending on the dimensions and circumferential speed of the chill roll, for effectively preventing gas flow entrainment. Preferably the wind shield is spaced from the nozzle center a distance of 150 mm or less, especially 70 mm or less as measured along the chill roll circumference.

The wind shield may be formed of any desired material. It may be suitably selected from various metals and resins as long as it can shield gas flow.

Suction means

In the practice of the invention, suction means may be provided in proximity to the circumference of chill roll 13 between wind shield 2 and paddle 113. The suction means is effective for sucking the ambient gas in proximity to the paddle to establish a local vacuum thereat, thereby further reducing the amount of ambient gas entrained between the alloy melt and the chill roll circumference.

Figure 4:
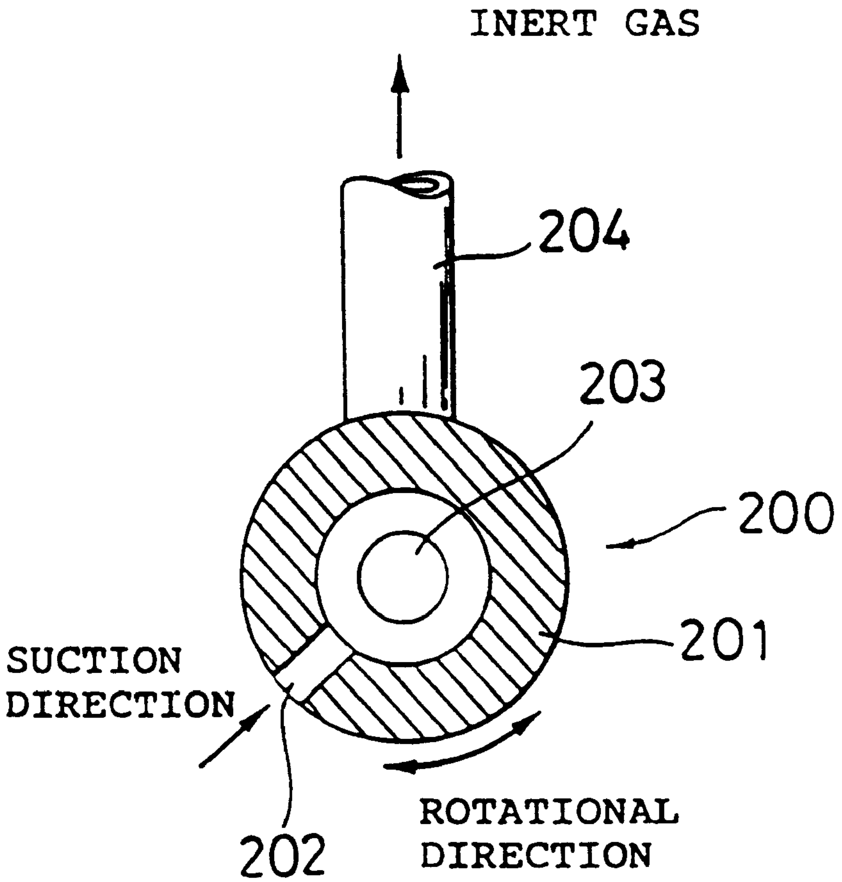
FIG. 4 is a cross-sectional view of a preferred exemplary inert gas suction member.

No particular limit is imposed on the construction of suction means. Preferred is one with a slit-shaped suction port having a longitudinal direction aligned with a transverse direction of the chill roll circumference. An exemplary preferred suction means is shown in FIGS. 3 and 4 as a suction member 200. The suction member 200 shown in FIG. 4 has a cylindrical peripheral wall 201 and a slit-shaped suction port 202 extending throughout the wall 201. The slit-shaped suction port 202 has a longitudinal direction extending substantially parallel to the axis of the suction member, i.e., cylindrical peripheral wall 201. One end of the cylindrical peripheral wall 201 (on the front plane of the sheet in the illustrated embodiment) is closed and the other end is connected to a gas outlet tube 204 in flow communication with the suction member interior through a hole 203. The other end of the gas outlet tube 204 is connected to a pump (not shown). With the pump actuated, the ambient gas is taken in through slit-shaped suction port 202 so that a vacuum is established in proximity to suction port 202.

The suction member 200 is disposed in proximity to the chill roll such that the axis of suction member 200 is substantially parallel to the axis of the chill roll. By rotating the suction member 200 about its axis, or by changing the position of suction member 200 relative to paddle 113, or by changing the amount of ambient gas extracted, the degree of vacuum in proximity to the paddle can be controlled as desired.

Since the action of suction means varies with the shape and dimensions of the suction port, suction quantity per unit time and other factors, the position of the slit-shaped suction port is not particularly limited and may be empirically determined so as to achieve the desired result. Preferably, the distance between the suction port and the nozzle is about 5 to about 70 mm as-measured along the chill roll circumference and the distance between the suction port and the chill roll circumference is about 0.1 to about 15 mm.

Understandably, the configuration of the wind shield and suction means may be empirically determined based on the analysis of the corrugations and grain diameter on the roll surface of the permanent magnet material produced therewith.

Inert gas blowing

In the practice of the present invention, an inert gas flow is preferably blown toward the chill roll circumference for urging the molten alloy present near the chill roll circumference against the chill roll, thereby increasing the contact time of the molten alloy with the chill roll circumference.

In the single roll process, molten alloy is impinged against the circumference of a rotating chill roll, dragged by the chill roll circumference while it is cooled in a thin ribbon form, and then separated from the chill roll circumference. If the alloy is in contact with the chill roll circumference for a sufficient time in the single roll process, then the alloy is cooled relatively uniformly on both the roll and free surfaces due to heat transfer to the chill roll. Differently stated, in order to obtain a quenched alloy having uniform crystal grain diameter, the alloy should be in full contact with the chill roll circumference while the alloy has almost solidified on the roll surface side, but remains molten on the free surface side.

However, a R—Fe—B series alloy in molten state tends to leave the chill roll circumference immediately after impingement against the chill roll circumference so that the alloy on the roll surface side is cooled mainly through heat transfer to the chill roll, but the alloy on the free surface side is cooled mainly through heat release to the ambient atmosphere, resulting in a substantial difference in cooling rate between the roll and free surface sides.

Now, by extending the contact time of the alloy with the chill roll circumference by the above-mentioned means, the proportion of dependency of cooling on the free surface side on heat transfer to the chill roll is increased to reduce the difference in cooling rate between the roll and free surface sides. Since inert gas is blown against the free surface side, the cooling rate on the free surface side is further improved. Accordingly, the difference in cooling rate between the roll and free surface sides is further reduced. Due to increased cooling efficiency, the necessary rotational speed of the chill roll can be reduced, for example, by 5 to 15%, mitigating the load of cooling apparatus.

FIG. 3 illustrates how to blow an inert gas flow. In the single roll process illustrated in FIG. 3, the molten alloy 11 is injected through the nozzle 12 against the circumference of chill roll 13 rotating relative to the nozzle 12 for contacting the molten alloy 111 present near the circumference of chill roll 13 with the chill roll 13 circumference, thereby cooling the molten alloy 111 from one direction. Understandably, the chill roll 13 is comprised of a base 131 and a surface layer 132 as previously described.

By blowing an inert gas flow toward the circumference of chill roll 13, the contact time of the molten alloy 111 near the chill roll 13 circumference with the chill roll 13 circumference is increased. Unless an inert gas flow is blown, the alloy would separate from the chill roll 13 circumference immediately after impingement with the chill roll 13 as depicted by phantom lines in the figure, resulting in a shorter contact time of the alloy with the chill roll circumference.

It will be understood that the molten alloy 111 is a solidified or molten mass or a partially solidified and partially molten mass depending on the distance from the nozzle 12 and is most often a thin ribbon containing a larger proportion of solidified alloy on the roll surface side and a larger proportion of molten alloy on the free surface side.

The direction of blowing an inert gas flow is toward the circumference of chill roll 13 such that the molten alloy 111 is sandwiched between the gas flow and the chill roll while no additional limitation is imposed. Preferably, inert gas is blown such that the angle between the blowing inert gas flow and the direction of advance of ribbon-shaped permanent magnet material 112 resulting from quenching is obtuse as shown by an arrow in FIG. 3. The preferred angle is in the range of about 100° to about 160°. This range of angle is selected for preventing the blowing inert gas from directly reaching a paddle 113, thereby maintaining the paddle 13 in steady state. If inert gas were blown directly to the paddle, the paddle would be locally cooled whereupon viscosity is increased so that the paddle might change its shape, thus failing to obtain an alloy ribbon of uniform thickness. Understandably, the direction of advance of ribbon-shaped permanent magnet material 112 substantially coincides with a tangential direction on the chill roll circumference where the melt 111 takes off from the chill roll 13.

Immediately after its impingement against the chill roll, the alloy melt is in molten state from its free surface to a substantial depth. If inert gas is blown against the melt in such entirely molten state, not only the free surface would become wavy due to the gas flow, failing to produce an alloy ribbon of uniform thickness, but also heat transfer within the melt is locally accelerated or delayed, resulting in a variation of grain diameter. It should thus be avoided to blow inert gas against the melt immediately after impingement against the chill roll.

More particularly, the inert gas is blown against the melt at a location spaced from the position immediately below the nozzle 12 by a distance of at least 5 times the diameter of nozzle 12.

No benefits are obtained by blowing inert gas at a location far remote from the paddle because the melt on the free surface side has been completely solidified at such a far location. Therefore, the location at which inert gas is blown against the melt is preferably limited within a distance of 50 times the diameter of nozzle 12 from the position where the molten alloy collides against the chill roll. The location at which inert gas is blown against the melt used herein is one end of the inert gas flow nearer to the nozzle 12 rather than the center thereof. In the case of a slit-shaped nozzle, the nozzle diameter used herein is the dimension of a slit as measured in the rotational direction of the chill roll. The inert gas blowing location is determined in relation to the nozzle diameter because the nozzle diameter dictates the paddle state and cooling efficiency which in turn, dictates the molten state of the melt.

No particular limit is imposed on the direction, flow rate, flow velocity, and injection pressure of blowing inert gas flow, which can be determined by taking into account various parameters including nozzle diameter, melt injection rate, chill roll dimensions, and cooling atmosphere, and empirically such that a desired grain diameter may be obtained in the melt between the roll and free surface sides. In an example wherein a melt is injected through a nozzle having a diameter of about 0.3 to 5 mm, inert gas is preferably injected through a slit having a longitudinal direction aligned with the transverse direction of a melt ribbon. The preferred inert gas blowing slit has a breadth of about 0.2 to about 2 mm and a longitudinal dimension of at least 3 times the transverse width of a melt ribbon and is spaced about 0.2 to about 15 mm apart from the chill roll circumference. The preferred injection pressure is from about 1 to about 9 kg/cm$^2$. A smaller spacing between the slit and the roll circumference would leave the possibility of contact of the slit with the melt on the roll surface whereas a larger spacing would allow the injected inert gas to diffuse so widely that the desired effect is little achieved and the paddle can be cooled therewith.

No particular limit is imposed on means for blowing inert gas. It is preferred in the practice of the invention to use an injector having an inert gas injecting orifice of slit shape as mentioned above or similar shape. Preferred is an injector which is rotatable or movable for changing the inert gas blowing location. That is, the injector is rotatable or movable to provide a variable position of contact with the melt of the inert gas flow at its end nearer to the nozzle.

Figure 5:
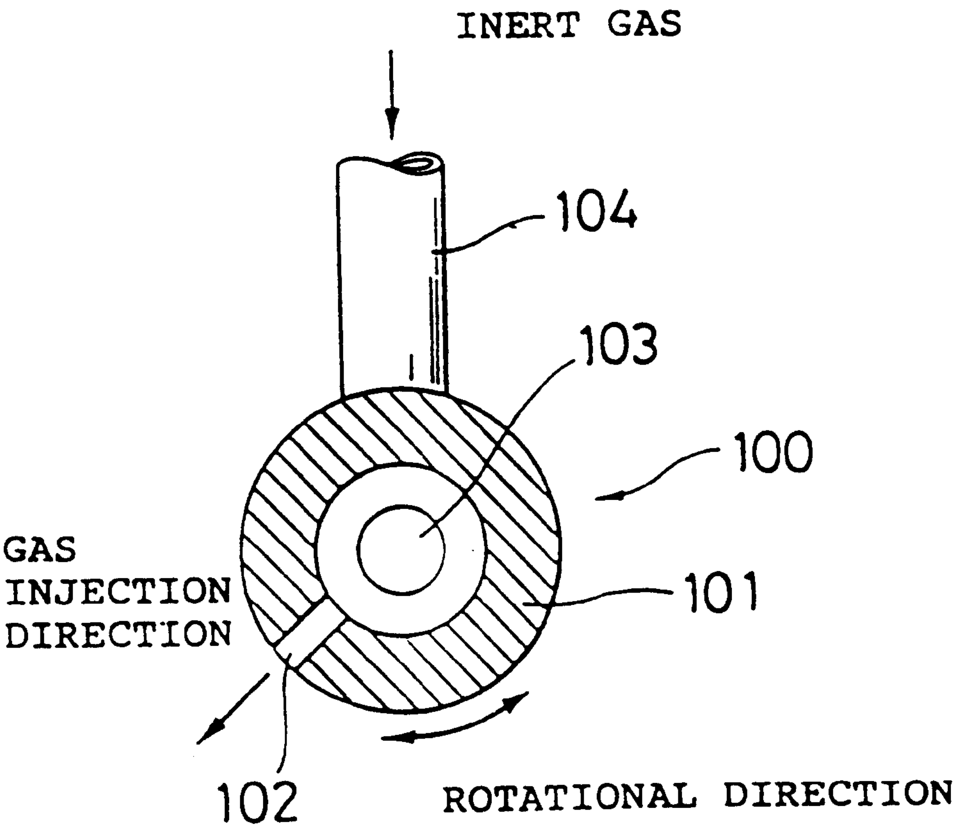
FIG. 5 is a cross-sectional view of a preferred exemplary inert gas injection member.

More particularly, an injector as shown in FIG. 5 is preferred. The injector 100 shown in FIG. 5 has a cylindrical peripheral wall 101 and a slit-shaped orifice 102 extending throughout the wall 101. The slit-shaped orifice 102 has a longitudinal direction extending substantially parallel to the axis of the injector, i.e., cylindrical peripheral wall 101. One end of the cylindrical peripheral wall 101 (on the front plane of the sheet in the illustrated embodiment) is closed and the other end is connected to a gas inlet tube 104 in flow communication with the injector interior through a hole 103. With this configuration, inert gas is channeled into the injector interior and then injected through the slit-shaped orifice 102 as a directional flow.

The injector 100 is disposed in proximity to the chill roll such that the axis of the injector 100 is substantially parallel to the axis of the chill roll. By rotating the injector 100 about its axis, the direction of blowing inert gas flow can be changed as desired.

Analysis of the permanent magnet material produced in this embodiment will detect that the inert gas blown during quenching is contained therein richer in proximity to the free surface than in the proximity to the roll surface. Ar or $N_2$ gas, if used as the inert gas, for example, can be readily detected by Auger analysis. The content of inert gas is about 50 to about 500 ppm in a region extending up to 50 nm from the free surface in a thickness direction.

Understandably, the inert gas blown against the alloy melt is preferably of the same type as the ambient gas.

Atmosohere

No particular limit is imposed on the inert gas which forms the atmosphere under which the present invention is practiced, and a choice may be made among various inert gases such as Ar gas, He gas, and $N_2$ gas, with the Ar gas being preferred. The pressure of the gas atmosphere is not particularly limited and may be suitably determined. For simplifying the structure of the apparatus used, for example, an inert gas flow at a pressure of about 0.1 to 2 atmospheres, often atmospheric pressure may be used. In an embodiment wherein molten alloy is cooled in a gas flow at such pressure, the use of the wind shield and the suction means both mentioned above is effective for substantially reducing the amount of ambient gas entrained between the molten metal and the chill roll, thereby improving the uniformity of crystal grain diameter in the vicinity of the roll surface. For example, a standard deviation of up to 13 nm, especially up to 10 nm can be readily achieved for the crystal grain diameter in a roll surface adjoining region. The roll surface adjoining region used herein is identical with the aforementioned region P, that is, a region extending from the roll surface to a depth equal to ⅕ of the magnet thickness.

The standard deviation of grain diameter in this region can be calculated by taking pictures under a transmission electron microscope such that more than about 100 grains are contained within the field. After more than 30, preferably more than 50 pictures are randomly took within the region, the average grain diameter in each field is calculated by image analysis or the like. The average grain diameter thus determined is generally an average diameter of circles equivalent to the grains. Finally, the standard deviation of these average grain diameters is determined.

In embodiments wherein the aforementioned wind shield is not provided in the single roll process or the twin roll process is used, it is preferred to carry out alloy cooling while maintaining the inert gas atmosphere below 90 Torr, especially below 10 Torr in the vicinity of the chill roll circumference where molten alloy impinges. Cooling in such an atmosphere of reduced pressure eliminates entrainment of inert gas between the alloy and the chill roll circumference, thus improving the degree of contact of the alloy with the chill roll circumference, thus reducing a local variation of the cooling rate on the roll surface, thus allowing a fine uniform crystal grain structure to form, eventually resulting in a permanent magnet material having high magnetic properties.

Where alloys of a composition having a relatively low R content, for example, a R content of 6 to 9.2 atom % are cooled, cooling under a reduced pressure of the above-mentioned range is preferred partially for avoiding overcooling by the ambient gas.

No particular lower limit is imposed on the atmosphere pressure. When radio-frequency induction heating is used for melting the alloy, it is preferred to enhance the insulation of a radio frequency induction heating coil because an electric discharge would otherwise occur between the coil and the chill roll under an atmosphere pressure of lower than $10^{-3}$ Torr, especially lower than $10^{-4}$ Torr.

The permanent magnet material produced in such a reduced pressure atmosphere has few depressions caused by entrainment of the ambient gas on the roll surface side and accordingly, a more uniform distribution of grain diameter in proximity to the roll surface. For example, the standard deviation of grain diameter in the roll surface adjoining region can be reduced to 10 nm or less, especially 7 nm or less.

The above-mentioned inert gas blowing is also effective when cooling is done in a reduced pressure atmosphere.

Cooling conditions

No particular limit is imposed on the dimensions of the chill roll used herein. The chill roll may have suitable dimensions for a particular purpose although it generally has a diameter of about 150 to about 1500 mm and a breadth of about 20 to about 100 mm. The roll may be provided with a water cooling hole at the center.

Although the circumferential speed of the chill roll varies with various parameters including the composition of alloy melt, the structure of an end permanent magnet material, and optional heat treatment, it preferably ranges from 1 to 50 m/s, especially from 5 to 35 m/s. Circumferential speeds below the range would allow the majority of permanent magnet material to have larger grains whereas circumferential speeds beyond the range would result in almost amorphous material having poor magnetic properties.

Figure 2:
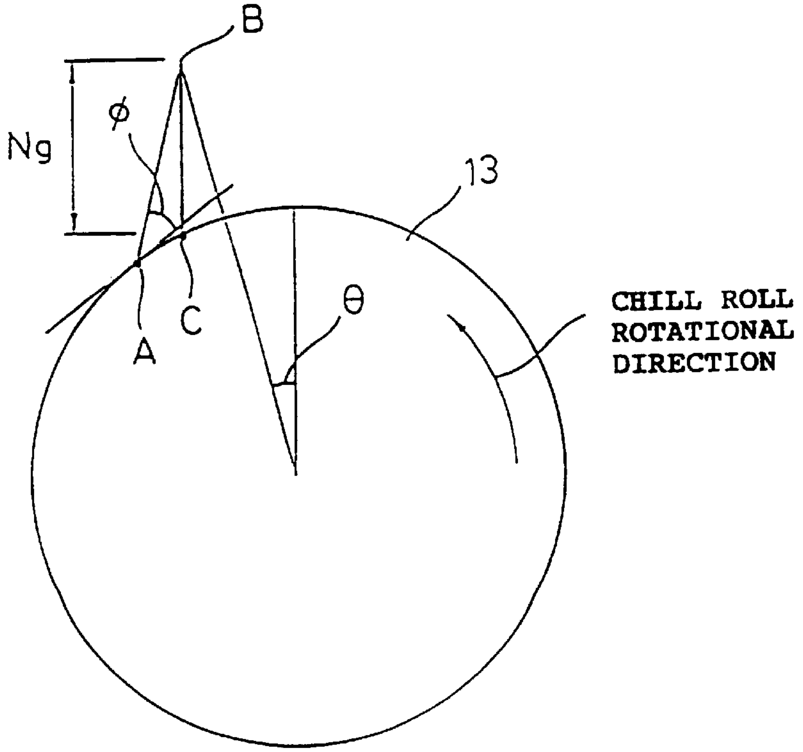
FIG. 2 is an elevational view showing the positional relation of a chill roll to a molten alloy injecting nozzle.

In general, the chill roll is disposed such that its axis is substantially horizontal. The nozzle may be located on a vertical line passing the chill roll axis as shown in FIG. 3 although the nozzle can be located on a front or rear side of the vertical line with respect to the rotational direction of the chill roll (that is, the right or left side in the figure). FIG. 2 shows the nozzle located on a forward side of the rotational direction of the chill roll. In this embodiment, the angle θ between a plane containing the vertical line and the chill roll axis and a plane containing the center B of the nozzle (the center of an orifice for injecting molten alloy) and the chill roll axis is preferably up to 45°.

Although an arrangement wherein molten alloy impinges substantially perpendicularly against the circumferential surface of the chill roll as shown in FIG. 3 is acceptable, it is preferred to cause the molten alloy to impinge against the chill roll circumference at an angle as shown in FIG. 2. That is, the molten alloy is preferably injected forward of the rotational direction of the chill roll (to the left in the figure) with respect to a plane containing the nozzle center B and the chill roll axis. More particularly, provided that A is the central location at which the molten alloy impinges against the chill roll circumferential surface, the angle ϕ between a tangent to the chill roll circumferential surface at A and line AB is preferably set to 45° to 78°. Impingement of the molten alloy against the chill roll circumference from a slant direction inhibits the bounding of the molten alloy upon impingement against the chill roll circumference, thus improving the contact of the molten alloy with the chill roll. Such benefits would become insufficient if the angle ϕ exceeds the range. Below the range, the molten alloy tends to slip on the chill roll circumference, lowering the contact of the molten alloy with the chill roll.

Provided that C is the intersection between a vertical line passing nozzle center B and the chill roll circumferential surface, line BC preferably has a length Ng of 1 to 7 mm. Since the chill roll thermally expands while cooling molten alloy and inevitably undergoes an eccentricity of about 50 μm a variation of cooling conditions by these factors would become significant if the length Ng is below the range. If the length Ng is beyond the range, the molten alloy as injected would spread on the chill roll circumference over a wider area, sometimes to droplets, failing to produce a homogeneous permanent magnet material.

The pressure difference (or differential pressure) of molten alloy in the nozzle between upper and lower surfaces is maintained substantially constant in the range of 0.1 to 0.5 $kgf/cm^2$ during molten alloy injection. By injecting the molten alloy under a substantially constant differential pressure within this range, the amount of molten alloy injected becomes constant so that a permanent magnet material having least varying properties is obtained. The differential pressure occurs as a result of the hydrostatic pressure of molten alloy in the nozzle, the difference between the ambient pressure at the upper surface and the ambient pressure at the lower surface of molten alloy in the nozzle or the like. In order to compensate for a loss of differential pressure due to injection of molten alloy for maintaining the differential pressure within the range, it is effective to control the amount of molten alloy supplied to the nozzle. Alternatively, the atmosphere surrounding the chill roll is separated from the atmosphere above the upper surface of molten alloy in the nozzle. Then the differential pressure can be controlled by depressing the atmosphere surrounding the chill roll or pressurizing the atmosphere above the upper surface of molten alloy.

EXAMPLE

Examples of the present invention is given below by way of illustration.

Chill rolls were manufactured by transversely moving a cutting tool along the circumference of a cylindrical base of copper-beryllium alloy while rotating the base, for cutting a spiral continuous groove in the circumferential surface of the base. Then a Cr surface layer was formed on the circumferential surface of the base by a conventional electrodeposition method using a Sargent bath, completing a chill roll. The base had a thermal conductivity of 3.6 J/(cm·s·K) and the Cr surface layer had a thermal conductivity of 0.43 J/(cm·s·K) and a Vickers hardness Hv of 950. A series of chill rolls as shown in Table 1 were manufactured by changing the moving rate of the cutting tool and the cutting tool-to-base distance during machining. The base had an outer diameter of 400 mm and the Cr surface layer had a thickness of 35 μm. The Cr surface layer was formed to a substantially constant thickness as shown in FIG. 1. The chill rolls had grooves of a sine-curve cross-sectional shape in a cross section containing the chill roll axis as shown in FIG. 1.

Using these chill rolls, ribbons of permanent magnet material were produced in accordance with the single roll process in the manner described below.

First, an alloy ingot having the composition: 9.5Nd—2.5Zr—8.0B—80Fe as expressed in atomic percentage was prepared by arc melting. The alloy ingot was placed in a quartz nozzle where it was melted by radio frequency induction heating. The molten alloy was rapidly quenched by injecting it against the chill rolls through the nozzle, obtaining permanent magnet material ribbons of 2 mm wide and 45 μm thick. Each chill roll was disposed such that its axis was substantially horizontal and the nozzle was disposed such that its orifice was on a vertical line passing the chill roll axis. The angle ϕ was 35°, distance Ng was 5 mm, and the atmosphere during quenching was Ar gas at 15 Torr. As the molten alloy was injected, a fresh molten alloy was admitted into the nozzle to maintain a differential pressure of 0.22 to 0.28 $kgf/cm^2$.

The permanent magnet materials produced at a chill roll circumferential speed of 28 m/s were examined for coercive force (iHc), maximum energy product ((BH)max), and the range $V_{80}$ of circumferential speed at which iHc became 80% or more of its maximum. A higher $V_{80}$ value indicates that the dependency of magnetic properties on circumferential speed is low. The results are shown in Table 1. Table 1 also reports the configuration of ridges on the roll surface of permanent magnet material corresponding to the grooves in the chill roll circumferential surface.

TABLE 1

| Chill roll No. | Groove pitch ($\mu$m) | Groove depth ($\mu$m) | Ra ($\mu$m) | Permanent magnet material: Ridge height ($\mu$m) | Ra ($\mu$m) | iHc (kOe) | (BH)max (MGOe) | $V_{80}$ (m) |
|---|---|---|---|---|---|---|---|---|
| 1 | 180 | 10 | 2.9 | 8 | 2.5 | 8.5 | 19 | 24 |
| 2 | 140 | 8 | 1.9 | 7 | 1.7 | 8.3 | 18.5 | 22 |
| 3 | 220 | 15 | 4.5 | 12 | 3.7 | 8.8 | 19 | 23 |
| 4 (comparison) | 400 | 12 | 3.2 | 11 | 3.0 | 8.2 | 17.5 | 3 |
| 5 (comparison) | 50 | 7 | 2.0 | 4 | 1.5 | 8.1 | 17.8 | 4 |

The effectiveness of the present invention is evident from the results of Table 1.

Each of the permanent magnet materials had a Cr content of about 100 ppm in a region of up to 20 nm deep from the roll surface.

What is claimed is:

1. A permanent magnet material having a plurality of longitudinally extending ridges on at least one major surface, the distance between two adjacent ones of the ridges being 100 to 300 $\mu$m on average.

2. A permanent magnet material according to claim 1 wherein the major surface having the ridges has a centerline average roughness (Ra) of 0.05 to 4.5 $\mu$m.

3. A permanent magnet material according to claim 1 wherein the ridges have an average height of 0.7 to 30 $\mu$m.

4. A permanent magnet material according to claim 1 which has a thickness with a standard deviation of up to 4 $\mu$m as measured at a position.

5. The permanent magnet material of claim 1 which is prepared by cooling a molten alloy containing R wherein R is at least one rare earth element inclusive of Y, Fe or Fe and Co, and B, wherein said chill roll has an axis, a circumferential surface, and a plurality of circumferentially extending grooves in the circumferential surface, and the distance between two adjacent ones of the grooves at least in a region with which the molten alloy comes in contact is 100 to 300 $\mu$m on average in a cross section containing the axis.

* * * * *